3,577,453
Patented May 4, 1971

1

3,577,453
TRIFLUOROMETHYL PHENYL-N-(HALOPHENYL)-
CARBAMATES AND PESTICIDAL PREPARA-
TIONS CONTAINING SAME
Otto Rohr, Therwil, and Hans Rudolf Hitz, Muttenz,
Switzerland, assignors to Ciba Limited, Basel, Swit-
zerland
No Drawing. Continuation-in-part of application Ser. No.
351,234, Mar. 11, 1964. This application June 16, 1967,
Ser. No. 646,449
Claims priority, application Switzerland, Mar. 15, 1963,
3,294/63
Int. Cl. C07c 125/06; A01n 9/20
U.S. Cl. 260—471                          3 Claims ABSTRACT OF THE DISCLOSURE
Compounds are provided of the formula

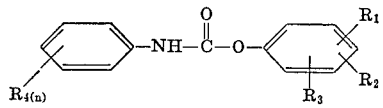

wherein $R_1$ represents hydrogen or halogen, alkyl with 1 to 4 carbon atoms, $-NO_2$, $-CF_3$ or $-CN$; $R_2$ represents hydrogen or halogen; $R_3$ represents alkyl containing 1 to 4 carbon atoms, $-NO_2$, $-CF_3$ or $-CN$, and $R_4$ represents halogen and $n=1$ or 2. The compounds of this invention are especially useful as pesticides for controlling bacteria and fungi.

This application is a continuation-in-part of application Ser. No. 351,234, filed Mar. 11, 1964, now abandoned.

The present invention provides compounds of the general formula (I)
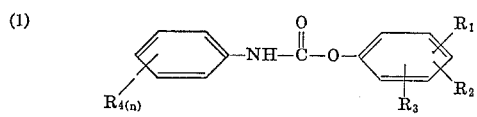

wherein $R_1$ represents a hydrogen or halogen atom, an alkyl radical with 1 to 4 carbon atoms, one of the groups $-NO_2$, $-CF_3$ or $-CN$; $R_2$ represents a hydrogen or halogen atom; $R_3$ represents an alkyl radical containing 1 to 4 carbon atoms or one of the groups $-NO_2$, $-CF_3$ or $-CN$; $R_4$ represents a halogen atom and $n=1$ or 2.

The invention provides, more especially, compounds of the general formula (II)
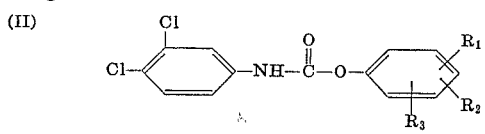

wherein $R_1$ represents a hydrogen atom, a chlorine atom, an alkyl radical containing 1 to 4 carbon atoms or one of the groups $-NO_2$, $-CF_3$ or $-CN$; $R_2$ represents a hydrogen atom or a chlorine atom; $R_3$ represents an alkyl radical containing 1 to 4 carbon atoms or one of the groups $-NO_2$, $-CF_3$ or $-CN$.

The new compounds of the general Formula 1 have a good action against, for example, harmful fungi, fungus spores and bacteria. The new compounds can be manufactured by methods known in the literature for manufac-

2 turing analogous compounds, for example by reacting a compound of the general formula

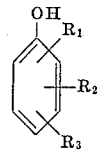

wherein $R_1$, $R_2$ and $R_3$ have the same meanings as in Formula 1 with an arylisocyanate of the general formula

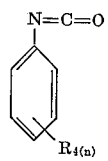

wherein $R_4$ and $n$ have the above meanings—in the presence of an inert organic solvent, for example ether or benzene. The new compounds of the general Formula 1 are suitable for use in general pest control, in plant protection and in hygiene. In this connection, it has proved especially advantageous that the new compounds, for example when used in plant protection, display no toxic side effects towards the host organism when applied in the concentrations necessary for antiparasitary purposes. The new compounds may be used for combating harmful organisms in various ways, for example also in timber protection, for preserving a wide variety of industrial products, for protecting fibrous materials from harmful microorganisms, for preserving agricultural produce, as disinfectants, in veterinary medicine and in body hygiene.

In this connection it is particularly valuable that the compounds of the invention do not lose their bactericidal and fungicidal actions even in the presence of proteinic substances and soaps. The new compounds have no objectionable odour of their own and are well tolerated on skin, at least on healthy skin. Accordingly, the present invention also provides pesticidal preparations which comprises a compound of the general Formula 1 given above and an additive. As additives there may be mentioned, for example, solvents, dispersants, wetting agents, adhesives or other pesticides.

As examples of the use of the new compounds in plant protection there may be mentioned the treatment of plant seeds and of wholly or only partially developed plants, and of the soil in which the plants grow, to protect the seeds, plants or soil from harmful organisms, especially harmful fungi, fungus spores and bacteria.

As industrial products suitable for preservation or disinfection with the aid of the new compounds there may be mentioned, for example, textile assistants and improving agents, glues, binders, paints, thickeners, color and printing pastes and similar preparations based on organic or inorganic dyestuffs or pigments, including those which contain as admixtures casein or other organic compounds. Also wall and ceiling paints, for example those which contain a porteinic dyestuff binder, can be protected from attacks by pests by admixture of the new compounds.

Furthermore, the new compounds may be used for protecting fibres and textiles, in which application they display a good action against harmful organisms, for example fungi and bacteria. The new compounds may be added before, while or after the said textile materials are treated with other substances, for example color or printing pastes, dressing agents or the like. Materials treated in this manner offer at the same time protection against body odour, such as is caused by microorganisms.

The new compounds may also be used as preservatives in the wood pulp and paper industries, inter alia for inhibiting the formation of slime in the paper making machines caused by microorganisms.

As further pesticides that may be used in conjunction or admixture with the active ingredients of the general Formula 1 there may be mentioned further fungicides, bactericides, acaricides, insecticides and fertilizers.

Depending on the type of additive admixed with the new active ingredients in the preparations of the invention there are obtained agents that are especially suitable for cleansing, disinfection or body hygiene.

Thus, for example, by combining the compounds of the invention with detergents or surfactants there are obtained washing and cleansing agents having an excellent antibacterial or antimycotic effect. The compounds of the general Formula 1 may, for example, be incorporated in soaps or combined with soapless substances having a detergent or surface-active effect, or they may be combined with mixtures of soaps with soapless detergent substances.

As examples of soapless detergents suitable for admixture with the new substances there may be mentioned, for example:

Alkylarylsulphonates, fatty alcohol sulphates, condensation products of fatty acids with methyltaurine, condensation products of fatty acids with hydroxyethanesulphonates, or of fatty acids with protein, alkylsulphonates, nonionic products, for example condensation products of alkylphenols with ethyleneoxides, and also cationic compounds. The new carbamates can also be used in coarse detergents, for example together with a condensed phosphate, such as 20 to 50% alkali metal tripolyphosphate, or in the presence of an organic lyophilic polymer capable of increasing the dirt carrying capacity of the washing liquor, for example an alkali metal salt of carboxymethylcellulose (cellulose glycollic acid).

In these applications the antibacterial and antimycotic efficiency of the new compounds is not affected by the addition of cleansing agents, for example anionic, cationic or nonionic products; in fact, in many cases such a combination actually increases the efficiency to an unexpected degree.

Such cleansing agents having a disinfectant effect may be used, for example, in washing, and in this application it is of importance that the new active ingredients, provided they are used in a suitable concentration, deposit from the washing liquor on the fibrous material and thereby impart to the latter a lasting antibacterial and antimycotic finish.

The cleansing preparations of the invention, which contain compounds of the general Formula 1, may be used both in industry and in the household and in the food industry, for example in dairies, breweries and abbattoirs.

The new compounds may also form part of preparations used for cleansing or disinfection in hospitals and in medicinal practice, for example for cleaning patients' wear, wards and apparatus; for such uses the new compounds may, if necessary, be combined with other disinfectants and antiseptics to satisfy all demands concerning cleaning and disinfection. In this connection it is of special importance that the new compounds do not lose their efficacy towards microorganisms even in the presence of blood or serum.

The new compounds may also be incorporated in preparations used for cleansing the skin, for example the hands, accompanied by an antibacterial and antimycotic effect, if necessary in conjunction with other bactericidal and/or fungicidal substances, protecting agents for the skin, and the like. The new compounds also prevent body odour such as is caused by microorganisms; in this connection it is again advantageous that the new compounds do not irritate healthy skin and have no objectionable odour of their own, as is the case, for example, with chlorinated phenols.

As microbicidal additives to be used in the preparations of the invention in addition to compounds of the general Formula 1 there may be mentioned, for example, 3,4-dichlorobenzyl alcohol, ammonium compounds, for example, diisobutylphenoxy-ethoxyethyl dimethylbenzyl ammonium chloride, cetyl pyridinium chloride, cetyl trimethyl ammonium bromide, halogenated dihydroxydiphenylmethanes, tetramethyl thiuramdisulfide, 2,2'-thiobis-(4,6-dichlorophenol); 2-nitro-2-furfuryl iodide salicylanilides, dichlorosalicylanilides, dibromosalicylanilides, tribromosalicylanilides, dichlorocyanuric acid, tetrachlorosalicylanilides, aliphatic thiuramsulphides, hexachlorophen (2,2'-dihydroxy-3,5,6; 3',5',6'-hexachlorodiphenylmethane).

The disinfectant preparations of the invention may contain as further ingredients antioxidants, light-filters, optical brighteners, dehardeners, aromas and the like.

To suit the wide variety of their uses the new preparations containing compounds of the general Formula 1 they may take numerous diverse forms, for example as soap tablets or semisolid or liquid soaps, pastes, powders, emulsions, suspensions, solutions in organic solvents, sprays, powders, granulates, tablets, sticks, in capsules of gelatin or other solid materials, as ointments, skin and shaving creams, mouthwashes, liquid, semi-solid or solid toothpastes and other dental preparations, in hair shampoos and other hair lotions, as aerosol preparations.

The action of the carbamates of the invention against pests, especially harmful microorganisms, may also be incorporated in mouldings made from plastic materials. When a plasticizer is used it is of advantage to add the biocidal substance, in the form of a solution of dispersion in the plasticizer, to the plastic material, making sure that the said substance is very evenly distributed in the plastic. Plastic materials thus made germ-repellant can be used for making a wide variety of articles for daily use for which prevention of the attack by diverse germs, for example putrefacients or fungi affecting the skin, is desirable, thus, for example, in door mats, handles, door fitments, public seats, treads in swimbaths, wall coverings and the like. By incorporating the new preparations in suitable floor waxes and polishes there are obtained products for treating floors and furniture which have a disinfectant effect.

The following examples illustrate the invention. Parts and percentages are by weight.

EXAMPLE 1

(A)

(a) 17.9 parts of 2-cyanophenol and 0.1 part of triethylenediamine are dissolved in 50 parts by volume of ether and while externally cooling with ice, a solution of 33.7 parts of 3,4-dichlorophenylisocyanate in 20 parts by volume of ether is added dropwise at 10 to 20° C. The precipitated reaction product is filtered off and recrystallized from acetonitrile, to yield the compound of the formula

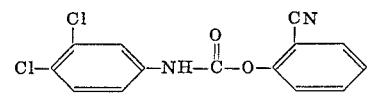

which melts at 172 to 173° C.

(b) 11.9 parts of 3-cyanophenol and 0.1 part of triethylenediamine are dissolved in 30 parts by volume of benzene; while cooling externally, a solution of 18.8 parts of 3,4-dichlorophenylisocyanate in 20 parts by volume of benzene is added dropwise at 40° C., and the mixture is then stirred for 2 hours at 60° C. The precipitated reaction product is filtered off and recrystallized from a mixture of acetone and benzine, to yield the compound of the formula

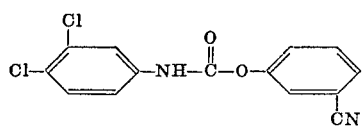

melting at 193 to 195° C.

(c) As described under (b) above, 11.9 parts of 4-cyanophenol are reacted with 18.8 parts of 3,4-dichlorophenylisocyanate. On crystallization from a mixture of acetone and benzine, the compound of the formula

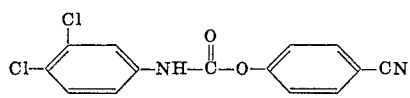

melting at 185 to 188° C. is obtained.

(d) As described under (b) above, 13.9 parts of 4-nitrophenol are reacted with 18.8 parts of 3,4-dichlorophenylisocyanate. After crystallization from a mixture of acetone and benzine, the compound of the formula

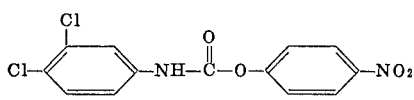

is obtained which melts at 195 to 196° C.

(B)

The compounds listed in the following table are manufactured in a similar manner:

| | Active ingredient | Melting at, °C. |
|---|---|---|
| 1 | Cl—⬡(Cl)—NH—CO—O—⬡(NO₂)—CH₃ | 131–133 |
| 2 | Cl—⬡(Cl)—NH—CO—O—⬡—CH₃ | 138–140 |
| 3 | Cl—⬡(Cl)—NH—CO—O—⬡(CF₃)(CF₃) | 117–118 |
| 4 | Cl—⬡(Cl)—NH—CO—O—⬡—CH(CH₃)₂ | 107–108 |
| 5 | Cl—⬡(Cl)—NH—CO—O—⬡(CH(CH₃)₂)(CH(CH₃)₂) | 132–135 |
| 6 | Cl—⬡(Cl)—NH—CO—O—⬡—C(CH₃)₃ | 132–134 |
| 7 | Cl—⬡(Cl)—NH—CO—O—⬡—C(CH₃)₃ (ortho) | 124–126 |
| 8 | Cl—⬡(Cl)—NH—CO—O—⬡(C(CH₃)₃)(C(CH₃)₃) | 170–172 |
| 9 | Cl—⬡—NH—CO—O—⬡(CF₃)—NO₂ | 125–126 |
| 10 | Cl—⬡(Cl)—NH—CO—O—⬡(Cl)—NO₂ | 153–156 |
| 11 | Cl—⬡(Cl)—NH—CO—O—⬡(Cl)—CN | 125–126 |

(C)

(a) 20.7 parts of 4-nitro-3-trifluoromethylphenol and 0.1 part of triethylenediamine are dissolved in 50 parts by volume of dioxan. 19.8 parts of meta-bromophenyl isocyanate are added dropwise at 20 to 30° C. The solvent is distilled off and the crystalline residue recrystallized from a mixture of acetone and benzine, to yield the compound of the formula

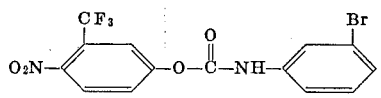

melting at 92–96° C.

(b) 20.7 parts of 4-nitro-3-trifluoromethylphenol and 0.1 part of triethylenediamine are dissolved in 100 parts by volume of benzene. 27.7 parts of 3,4-dibromophenyl isocyanate, dissolved in 20 parts by volume of benzene, are added dropwise at 20 to 30° C. while cooling externally with ice. The precipitated reaction product is filtered and recrystallized from a mixture of acetone and benzine, to yield the compound of the formula

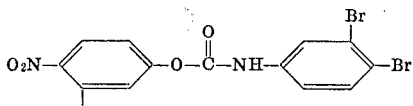

melting at 129–131° C.

(D)

The compounds of the following table are prepared in an analogous manner:

| | | |
|---|---|---|
| 1. | ⬡(Cl)(CH₃)—O—CO—NH—⬡(Br)—Br | 125–129° |
| 2. | ⬡(CH₃)(CH₃)—O—CO—NH—⬡(Br)—Br | 139–141° |

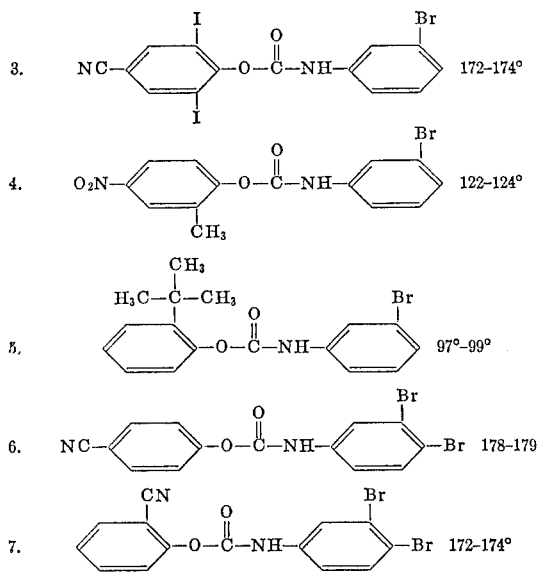

EXAMPLE 2

(a) Antibacterial effect in the dilution test

In each test 1 part of active ingredient was microground with 1 part of dinaphthylmethanedisulphonic acid and made up with water to an emulsion containing 2% of the active ingredient. 1 ml. of each batch was diluted with an equal amount of water and in this form further diluted in tubes with 9 ml. of sterile glucose broth to the concentrations 100, 10, 1 and 0.1 part per million. These solutions were then inoculated with *Staphylococcus aureus* and incubated for 48 hours at 37° C. (bacteriostatic action). After 24 hours growth each culture was smeared on glucose agar and incubated for 24 hours (bacteriocidal action).

After the afore-mentioned times the following limit concentrations were found:

| Active substance | Bacteriostatic action, p.p.m. | Bacteriocidal action, p.p.m. |
|---|---|---|
| 2-cyanophenyl-N-3,4-dichlorophenyl carbamate | 10 | 100 |
| 3-cyanophenyl-N-3,4-dichlorophenyl carbamate | 100 | 100 |
| 4-cyanophenyl-N-3,4-dichlorophenyl carbamate | 10 | 100 |
| 4-nitrophenyl-N-3,4-dichlorophenyl carbamate | 10 | 100 |
| 2-nitro-4-cresyl-N-3,4-dichlorophenyl carbamate | 10 | 100 |
| 4-cyan-2,6-diiodophenyl-N-3-bromophenyl carbamate | 3 | 3 |
| 4-nitro-3-trifluoromethylphenyl-N-3-bromophenyl carbamate | 10 | 10 |
| 2,6-dimethylphenyl-N-3,4-dibromophenyl carbamate | 1 | 1 |
| 4-nitro-3-trifluoromethylphenyl-N-3,4-dibromophenyl carbamate | 0.3 | 1 |
| 4-cyanphenyl-N-3,4-dibromophenyl carbamate | 1 | 3 |

(b) Antibactrial effect in the presence of soap

Equal parts of a 10% soap solution and a 0.2% microfine dispersion of the active substance were mixed. 1 ml. of this mixture (=1000 p.p.m. of active substance) was added to 9 ml. of sterile glucose broth (=100 p.p.m.) and further diluted in tubes to the concentrations 10, 1 and 0.1 p.p.m. (for procedure and evaluation see under (a) above. The following limit concentrations were measured:

| Active substance | Bacteriostatic action, p.p.m. | Bacteriocidal action, p.p.m. |
|---|---|---|
| 2-cyanophenyl-N-3,4-dichlorophenyl carbamate | 1 | 10 |
| 3-cyanophenyl-N-3,4-dichlorophenyl carbamate | 1 | 1 |
| 4-cyanophenyl-N-3,4-dichlorophenyl carbamate | 1 | 10 |
| 4-nitrophenyl-N-3,4-dichlorophenyl carbamate | 1 | 10 |
| 2-nitro-4-cresyl-N-3,4-dichlorophenyl carbamate | 0.5 | 0.5 |

(c) Antimycotic action of the active substances

Mixtures containing 1% of active ingredient in propyleneglycol were diluted in tubes with sterile beer wort solution (10% to the concentrations 250, 125, 62 and 31 p.p.m. Testing for the fungostatic limit concentrations revealed the following values:

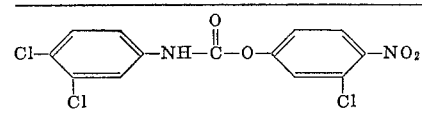

What is claimed is:
1. The compound of the formula

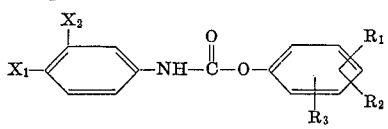

wherein $X_1$ represents a member selected from the group consisting of hydrogen, chlorine and bromine, $X_2$ represents a member selected from the group consisting of bromine and chlorine and wherein $R_1$ represents a member selected from the group consisting of a hydrogen atom, an iodine atom, an alkyl radical containing 1 to 4 carbon atoms, and the —$CF_3$ group, $R_2$ represents a member selected from the group consisting of a hydrogen atom and an iodine atom, and $R_3$ represents a member selected from the group consisting of an alkyl radical containing 1 to 4 carbon atoms, the —$NO_2$ and the —$CF_3$ radicals, at least one of $R_1$ and $R_3$ being a —$CF_3$ radical.

2. The compound of the formula

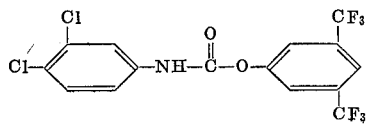

3. The compound of the formula

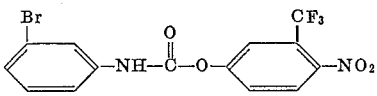

References Cited
UNITED STATES PATENTS

| | | | |
|---|---|---|---|
| Re. 24,868 | 10/1958 | Beaver et al. | 260—471 |
| 2,858,328 | 10/1958 | Beaver et al. | 260—471 |
| 2,951,786 | 9/1960 | Pullen et al. | 260—471X |
| 3,036,112 | 5/1962 | Lynn | 260—465 |
| 3,245,774 | 4/1966 | Bachmann | 260—465X |
| 3,428,669 | 2/1969 | Grier et al. | 260—471 |

CHARLES B. PARKER, Primary Examiner

D. R. PHILLIPS, Assistant Examiner

U.S. Cl. X.R.

21—58; 106—15; 252—106; 260—465; 424—300